(12) United States Patent
Reu et al.

(10) Patent No.: US 8,446,575 B1
(45) Date of Patent: May 21, 2013

(54) IMAGING DOPPLER VELOCIMETER WITH DOWNWARD HETERODYNING IN THE OPTICAL DOMAIN

(75) Inventors: Phillip L. Reu, Albuquerque, NM (US); Bruce D. Hansche, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 1657 days.

(21) Appl. No.: 11/268,943

(22) Filed: Nov. 8, 2005

(51) Int. Cl.
*G01P 3/36* (2006.01)
(52) U.S. Cl.
USPC ........... 356/28; 356/3.01; 356/5.01; 356/28.5
(58) Field of Classification Search
USPC ....... 356/28, 3.01–3.15, 4.01–4.1, 5.01–5.15, 356/6–22, 28.5
See application file for complete search history.

(56) References Cited

U.S. PATENT DOCUMENTS

| | | | |
|---|---|---|---|
| 4,935,616 A | 6/1990 | Scott | |
| 6,285,288 B1* | 9/2001 | Langdon et al. | 340/603 |
| 2004/0118624 A1* | 6/2004 | Beuhler et al. | 180/167 |
| 2005/0146706 A1* | 7/2005 | Kameyama et al. | 356/28 |

OTHER PUBLICATIONS

Pedrini et al, "Temporal phase unwrapping of digital hologram sequences", Applied Optics, vol. 42, No. 29, Oct. 10, 2003, pp. 5846-5854.
Pedrini et al, "Digital-holographic interferometry with an image-intensifier system", Applied Optics, vol. 41, No. 4, Feb. 1, 2002, pp. 648-653.
Joenathan et al, "Speckle interferometry with temporal phase evaluation: influence of decorrelation, speckle size, and nonlinearity of the camera", Applied Optics, vol. 38, No. 7, Mar. 1, 1999, pp. 1169-1178.
Huntley et al, "Phase-shifted dynamic speckle pattern interferometry at 1 kHz", Applied Optics, vol. 38, No. 31, Nov. 1, 1999, pp. 6556-6563.
Haible et al, "Heterodyne temporal speckle-pattern interferometry", Applied Optics, vol. 39, No. 1, Jan. 1, 2000, pp. 114-117.
Aguanno et al, "Speckle Interferometry Using a CMOS-DSP Camera for Static and Dynamic Deformation Measurements", 12th International Conference on Experimental Mechanics (ICEM12), Aug. 29-Sep. 2, 2004, Politecnico di Bari, Italy, 8 pages.
Joenathan et al, "Speckle Interferometry with Temporal Phase Evaluation for Measuring Large-Object Deformation", Applied Optics, vol. 37, No. 13, May 1, 1998, pp. 2608-2614.
Davila et al, "Measurement of Sub-Surface Delaminations . . .", Optics and Lasers in Engineering, 40 (2003), Jan. 7, 2002, pp. 447-458.
Markov et al, "Optoacoustical Sensor to Examine the Structural Integrity of . . .", Optical Engineering, 42(5), May 2003, pp. 1277-1287.
Sabatier et al, "Vibration Sensors for Buried Landmine Detection", Int'l. Conf. on Requirements . . . for the Detection . . . of Landmines . . . , Sep. 15-18, 2003, 11 pages.
User Manual, "Laser Doppler Vibrometer", Polytec, Document ID No. Man-Vib-OFV3001-0800-04e, pp. C-2 and D-7.

* cited by examiner

*Primary Examiner* — Luke Ratcliffe
(74) *Attorney, Agent, or Firm* — Scott B. Stahl

(57) ABSTRACT

In a Doppler velocimeter, the incoming Doppler-shifted beams are heterodyned to reduce their frequencies into the bandwidth of a digital camera. This permits the digital camera to produce at every sampling interval a complete two-dimensional array of pixel values. This sequence of pixel value arrays provides a velocity image of the target.

20 Claims, 2 Drawing Sheets

28 — obtain unaliased velocity information for a single point and possibly-aliased velocity information for remaining points 29 — process possibly-aliased velocity information based on the single-point velocity information and a priori assumptions about the mechanical system

FIG. 2

IMAGING DOPPLER VELOCIMETER WITH DOWNWARD HETERODYNING IN THE OPTICAL DOMAIN

This invention was developed under Contract DE-AC04-94AL8500 between Sandia Corporation and the U.S. Department of Energy. The U.S. Government has certain rights in this invention.

FIELD OF THE INVENTION

The invention relates generally to velocimeters and, more particularly, to Doppler velocimeters.

BACKGROUND OF THE INVENTION

A velocimeter measures the velocity of a target structure or object. A given target for which a velocity measurement is desired can be in the form of a solid or fluid. As the structural models used to represent targets become more detailed, there is an increasing need to measure the velocities of small components in microsystems, for example, micro-electro-mechanical systems, or MEMS. In the MEMS example, it is desirable to measure the velocity of parts such as gears and accelerometer reaction masses. It is not practical to attach a transducer to small components such as these, because the transducer will change the structure significantly due to mass loading by the transducer itself. Therefore, a non-contact method of velocity measurement is needed. There is a similarly increasing need to measure velocities associated with, for example, rotations, vibrations and impacts in macroscopic systems of larger components.

A laser Doppler velocimeter (LDV) is an interferometric instrument that uses the Doppler Effect to measure velocity. Laser light from a source at a single optical frequency is scattered by a moving object (e.g., an extended solid, particles, or even gases), and the optical frequency of the laser light is shifted due to the motion of the object. The optical frequency of the Doppler shifted light is compared to the aforementioned optical frequency of the laser light source. The difference between these two optical frequencies is proportional to the velocity of the target. With typical velocities involved in structural mechanics, the difference frequency can be expected to be at least in the tens of kilohertz to tens of megahertz (MHz). Frequencies in this range typically limit conventional LDVs to performing a single point velocity measurement at a time. A set of velocities associated with an array of physical points on the target is referred to as a "velocity image" of the target. Such a velocity image is conventionally built up by obtaining velocity information for a plurality of different points on the target in sequential fashion, one point after another. This can take several minutes for a velocity image of an object in steady state vibration, and is impossible for transient events such as impacts.

Some conventional approaches propose to produce a velocity image without the aforementioned temporal limitation that sequential, point-after-point operations impose. They physically replicate a single point instrument as many times as necessary to produce a composite instrument that contains enough single point instruments operating in parallel to generate the desired velocity image all at once. This physical replication approach is essentially a "brute force" approach which requires additional expense and design complexity.

It is desirable in view of the foregoing to provide the capability of producing a velocity image without the aforementioned difficulties associated with prior art approaches.

Exemplary embodiments of the present invention heterodyne the incoming Doppler-shifted beams to reduce their frequencies into the bandwidth of a digital camera. This permits the digital camera to produce at every sampling interval a complete two-dimensional array of pixel values. This sequence of pixel value arrays provides a velocity image of the target.

BRIEF DESCRIPTION OF THE DRAWINGS

FIG. 2 illustrates exemplary operations which can be performed by the data processor of FIG. 1 according to exemplary embodiments of the invention.

DETAILED DESCRIPTION

Figure 1:
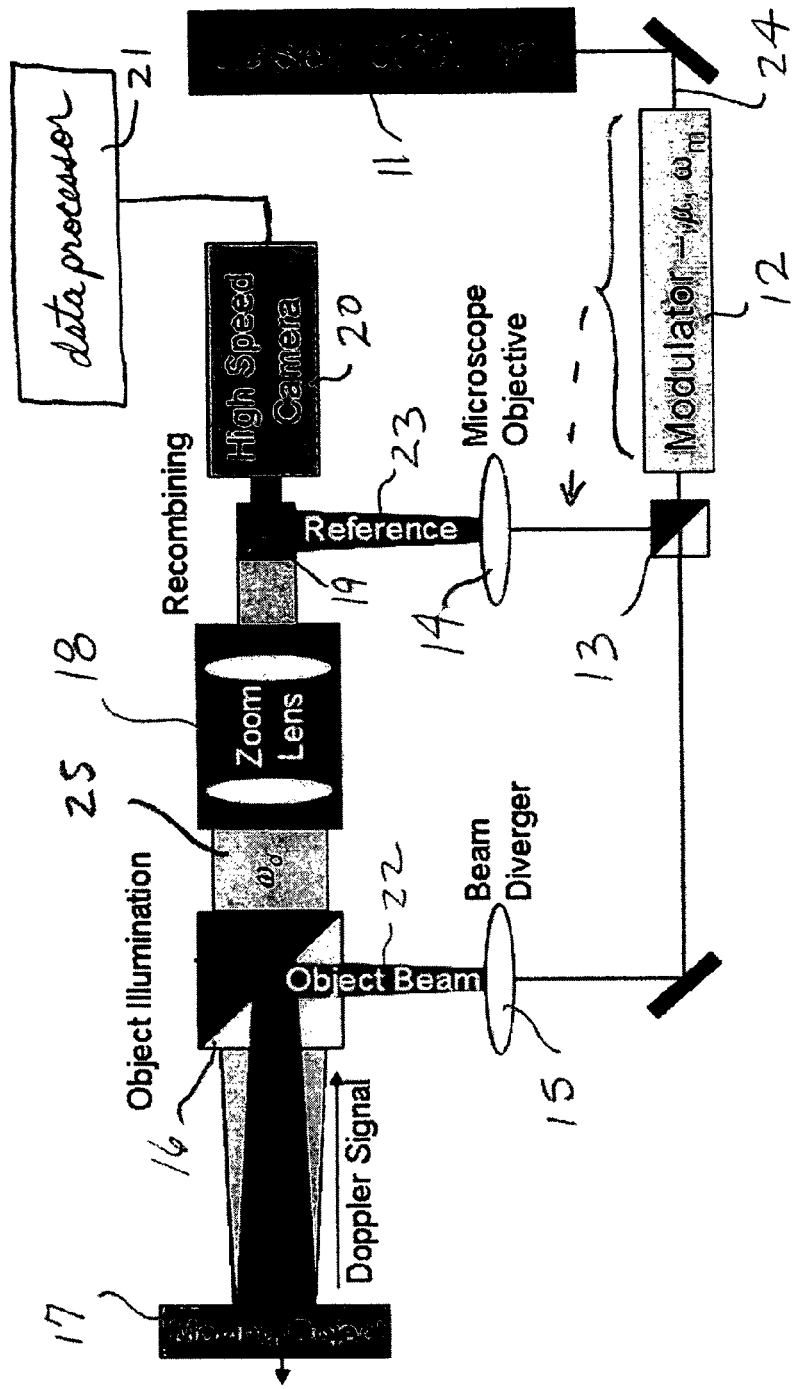
FIG. 1 diagrammatically illustrates an imaging Doppler velocimeter according to exemplary embodiments of the invention.

FIG. 1 diagrammatically illustrates an imaging Doppler velocimeter according to exemplary embodiments of the invention. An illumination source apparatus produces an object beam 22 and a reference beam 23 to be used in acquiring a velocity image of a moving target object 17. The illumination source apparatus includes a light beam source 11, and a beam processor designated generally at 12-15. In some embodiments, the light beam source 11 includes a 532 nm wavelength coherent laser. A source beam 24 from the light beam source 11 is passed through an optical modulator 12 which amplitude modulates the laser light. In various embodiments, the modulator 12 is an electro-optic modulator, an acousto-optic modulator, or a Bragg cell. In some embodiments, the modulator 12 is shifted from the illustrated position between the light beam source 11 and the beam splitter 13 to an alternative position between the beam splitter 13 and the microscope objective 14. This alternative positioning is illustrated by broken line in FIG. 1.

The beam splitter 13 divides its input into beams used to produce the reference and object beams 23 and 22. A beam diverger 15 diverges the beam that it receives from the beam splitter 13 to produce the object beam 22. This diverged object beam 22 is projected via an object illumination beam splitter 16 to illuminate the target. Doppler-shifted return beams 25 scattered back from the target are focused by a zoom lens 18 through a recombining beam splitter 19, which combines the Doppler-shifted return beams with the reference beam 23 that is output from the microscope objective 14, forming an image of the moving object 17 on a digital camera 20. The digital camera 20 captures the image. Some embodiments of the digital cameral 20 use CCD device technology. Other embodiments of the digital camera 20 use CMOS device technology.

The recombining beam splitter 19 uses the reference beam 23 (a modulated version of the source beam 24) to heterodyne the frequency of the Doppler-shifted return beams downwardly into the bandwidth of the digital camera 20. This downward heterodyning into the camera's bandwidth helps to ensure that the camera will see frequencies that are low enough to permit the camera to produce at each of its sampling intervals a complete two-dimensional array of frequency modulated digital pixel values. The sequence of pixel value arrays provides the desired velocity image of the target object 17. The data processor 21 can then process the digital pixel values to determine the desired velocity information.

In general, heterodyning relies on the trigonometric property that the product of two harmonic signals consists of terms containing the sum and difference of the frequencies of the original two signals. In an electronic circuit, the two signals are added, and the result passed through a nonlinear element to create product terms. In the optical heterodyne system of FIG. 1, the beam combiner 19 adds each incoming beam 25, having a Doppler-shifted frequency $\omega_o+\omega_d$, to the reference beam 23, whose frequency is $\omega_o$, the optical frequency of the illumination source. The camera responds to intensity, which is the square of the amplitude, so this acts as the aforementioned nonlinear element, yielding terms with frequencies of $2(\omega_o+\omega_d)$ and $\omega_d$. If either the reference beam 23, or both the reference beam 23 and the object beam 22, are modulated at modulation frequency $\omega_m$, as shown in FIG. 1, various combinations of sum and difference terms, are generated. All terms at the optical frequency $\omega_o$ and above are too fast for the camera to respond to, and are seen as a DC term. Taking account of the various beamsplitter reflectivities, and divergence terms, the final intensity equation of the system shown in FIG. 1 becomes:

$$I(t)=DC+A\cos(\omega_m t)+B\cos(\omega_d t)+C[\cos((\omega_m-\omega_d)t)+\cos((\omega_m+\omega_d)t)]+D\cos(\omega_m t) \quad (1)$$

The heterodyned difference term $(\omega_m-\omega_d)$ can be exploited to determine the Doppler frequency $\omega_d$. Based on the known bandwidth/sampling rate of the digital camera 20, and (ideally) the highest expected Doppler frequency value, the modulation frequency can be selected to force the aforementioned heterodyned difference term $(\omega_m-\omega_d)$ to be within the camera's sampling capability. The Doppler frequency $\omega_d$ may then be easily calculated based on the selected modulation frequency $\omega_m$. In some embodiments, $\omega_m$ is varied (e.g., swept or chirped) relatively slowly, so the intensity values of the pixels exhibit correspondingly slow oscillations when $\omega_m$ is near $\omega_d$, with constant intensity when $\omega_m=\omega_d$.

Some embodiments use either a conventional fast photodiode or a conventional stand-alone single point LDV to obtain a representative Doppler frequency value, and then use this representative value together with the bandwidth/sampling rate of the digital camera to continuously determine the modulation frequency. Although such a representative Doppler frequency value may not represent the highest expected Doppler frequency value, it is nevertheless adequate for use in determining a suitable modulation frequency.

Some embodiments adjust the aforementioned representative frequency value upwardly, and use the resulting adjusted frequency value, together with the bandwidth/sampling rate of the digital camera, to determine the modulation frequency. This adjusted frequency value can be expected to be either higher than the highest Doppler frequency, or at least closer to it than is the representative frequency value.

Equation 1 represents the situation where both the reference and object beams 23 and 22 are modulated, as shown in FIG. 1. However, Equation 1 changes only slightly when the only the reference beam 23 is modulated (shown by broken line in FIG. 1), and still contains the heterodyned difference term $(\omega_m-\omega_d)$, which can be exploited to determine the Doppler frequency $\omega_d$.

Joint Time Frequency Analysis (JTFA) is an extension of the well known Fast Fourier Transform (FFT) that is often used to extract frequency information from a signal. JTFA extends this concept for time varying frequencies (f(t)). A time-varying signal analyzed with the FFT would smear the frequencies across the spectrum and yield no information. However, by taking smaller subsets of the time sample, a Short Term Fourier Transform (STFT) can be performed to obtain the frequency versus time relationship. The STFT is only one of a family of methods, such as Gabor spectrogram, Choi-Williams Distribution, etc., used in JTFA. Various embodiments can use any of these exemplary approaches to process the incoming sequences of pixel values and thereby obtain the desired velocity information.

Digital sampling carries with it the innate problem of potentially undersampling the signal. That is, not digitizing it quickly enough to accurately recreate or measure the signal attributes. This results in aliasing. Generally speaking, aliasing should be avoided. This however is not always possible, especially with optical sensors. Sub-Nyquist sampling (i.e. sampling below the Nyquist rate) has been exploited in many conventional applications, including Doppler radar and military applications. According to exemplary embodiments of the invention, the general concept of sub-Nyquist sampling can be tailored to the application of wide-field LDV. This is possible because of a priori assumptions that can be made for certain types of mechanical systems. Examples of such assumptions include surface continuity over certain defined spatial areas, and possibly temporal band limiting of the mechanical response. This permits, for instance, measurement of the velocity at one given point (for example, with a conventional single point LDV), and then utilization of this velocity measurement information to calculate the spatial velocity distribution within the spatially continuous surface area.

For example, a plate rotating on a turntable will have a velocity distribution of zero at the rotation axis (the known velocity in this case), and will have a linearly varying velocity on either side of that. The velocity information is directly proportional to the Doppler frequency information $\omega_d$ by $\omega_d=4\pi v/\lambda$. Using the known zero point on the object, and the velocity continuity of the surface, i.e., the surface is a continuous surface without cracks, the aliased velocity information can be unwrapped to yield the true velocity over the entire field of view. This has the effect of extending the sampling bandwidth of the camera. Depending on the integration time of the camera, a bandwidth multiplication of up to 10 times is possible in various embodiments. In some embodiments, a continuous surface is defined as one in which a line can be drawn from the known velocity point to any point to be unwrapped, following any arbitrary path through valid data, without crossing a discontinuity. The capability of extending the camera bandwidth is useful due to the limited bandwidth of digital cameras.

FIG. 2 illustrates at 28 and 29 the aliasing compensation operations described above according to exemplary embodiments of the invention. The data processor 21 of FIG. 1 is capable of performing these operations in some embodiments.

Although exemplary embodiments of the invention have been described above in detail, this does not limit the scope of the invention, which can be practiced in a variety of embodiments.

What is claimed is:

1. A velocimeter apparatus, comprising:
    a heterodyning unit that receives and heterodynes Doppler-shifted optical beams that have been scattered from a target, producing respectively corresponding heterodyned optical beams at respectively lower frequencies than the corresponding Doppler-shifted optical beams;
    a digital camera positioned relative to said heterodyning unit to receive the heterodyned optical beams, said digital camera converting the heterodyned optical beams into respectively corresponding sequences of digital values; and
    a digital data processor coupled to said digital camera for producing in response to said sequences of digital values a velocity image associated with the target.

2. The apparatus of claim 1, including an illumination source that produces, in response to a source beam, an object beam for illuminating the target, said illumination source including an optical modulator that produces a modulated beam in response to the source beam, said illumination source producing a reference beam in response to the modulated beam, said heterodyning unit positioned relative to said illumination source to receive the reference beam, and said heterodyning unit combining the reference beam with each of the Doppler-shifted optical beams.

3. The apparatus of claim 2, wherein said optical modulator includes one of an electro-optical modulator, an acousto-optical modulator, and a Bragg cell.

4. The apparatus of claim 2, wherein said illumination source includes a source beam processor that receives the source beam, said source beam processor including a beam splitter having an input and having first and second outputs, said source beam processor using said first output of said beam splitter to produce the object beam, and said source beam processor using said second output of said beam splitter to produce the reference beam.

5. The apparatus of claim 4, wherein said source beam processor includes said optical modulator positioned between the source beam and said beam splitter input.

6. The apparatus of claim 5, wherein said optical modulator includes one of an electro-optical modulator, an acousto-optical modulator, and a Bragg cell.

7. The apparatus of claim 4, wherein said source beam processor includes said optical modulator positioned between said second output of said beam splitter and said heterodyning unit, and wherein said beam splitter input receives the source beam.

8. The apparatus of claim 7, wherein said optical modulator includes one of an electro-optical modulator, an acousto-optical modulator, and a Bragg cell.

9. The apparatus of claim 2, wherein said optical modulator receives a periodic modulating signal at a modulating frequency, and wherein said modulating frequency is determined based on an expected frequency of one of said Doppler-shifted beams.

10. The apparatus of claim 9, wherein said modulating frequency is determined based on a sampling rate of said digital camera.

11. The apparatus of claim 2, wherein said optical modulator receives a periodic modulating signal at a modulating frequency, and wherein said modulating frequency is determined based on a sampling rate of said digital camera.

12. The apparatus of claim 1, wherein said digital camera includes one of a plurality of charge coupled devices and a plurality of CMOS devices.

13. The apparatus of claim 1, wherein said data processor implements short time Fourier transform (SIFT) processing.

14. A method of obtaining a velocity image, comprising:
receiving Doppler-shifted optical beams that have been scattered from a target;
heterodyning the Doppler-shifted optical beams to produce respectively corresponding heterodyned optical beams at respectively lower frequencies than the corresponding Doppler-shifted optical beams;
converting the heterodyned optical beams into respectively corresponding sequences of digital values; and
producing in response to said sequences of digital values a velocity image associated with the target.

15. The method of claim 14, including producing a modulated beam in response to a source beam, and producing a reference beam in response to the modulated beam, said heterodyning step including combining the reference beam with each of the Doppler-shifted optical beams.

16. The method of claim 15, including determining a modulation frequency for use in producing the modulated beam based on an expected frequency of one of the Doppler-shifted beams.

17. The method of claim 16, including determining said modulation frequency based on a sampling rate used in said converting step.

18. The method of claim 15, including determining a modulation frequency for use in producing the modulated beam based on a sampling rate used in said converting step.

19. The method of claim 14, wherein said converting step includes using one of a plurality of CCD devices and a plurality of CMOS devices.

20. The method of claim 14, wherein said producing step includes using STFT processing.

* * * * *